United States Patent
Tran et al.

(10) Patent No.: US 7,937,413 B2
(45) Date of Patent: May 3, 2011

(54) SELF-ADAPTIVE PREFIX ENCODING FOR STABLE NODE IDENTIFIERS

(75) Inventors: Brian Thinh-Vinh Tran, San Jose, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 10/709,415

(22) Filed: May 4, 2004

(65) Prior Publication Data
US 2006/0004858 A1     Jan. 5, 2006

(51) Int. Cl.
*G06F 17/30* (2006.01)
(52) U.S. Cl. .................................. 707/803; 707/790
(58) Field of Classification Search .............. 707/104, 707/790, 803
See application file for complete search history.

(56) References Cited

U.S. PATENT DOCUMENTS

| | | | |
|---|---|---|---|
| 4,794,528 A | 12/1988 | Hirose et al. | |
| 5,151,697 A * | 9/1992 | Bunton | 341/51 |
| 5,608,904 A | 3/1997 | Chaudhuri et al. | |
| 5,706,498 A | 1/1998 | Fujimiya et al. | |
| 5,883,589 A | 3/1999 | Takishima et al. | 341/67 |
| 6,058,397 A | 5/2000 | Barrus et al. | |
| 6,085,188 A | 7/2000 | Bachmann | |
| 6,263,332 B1 * | 7/2001 | Nasr et al. | 707/5 |
| 6,295,526 B1 | 9/2001 | Kreiner et al. | |
| 6,313,766 B1 | 11/2001 | Langendorf et al. | 341/67 |
| 6,353,820 B1 | 3/2002 | Edwards et al. | |
| 6,381,605 B1 | 4/2002 | Kothuri et al. | |
| 6,437,799 B1 | 8/2002 | Shinomi | |
| 6,510,434 B1 | 1/2003 | Anderson et al. | |
| 6,539,369 B2 | 3/2003 | Brown | 707/1 |
| 6,539,396 B1 | 3/2003 | Bowman-Amuah | |

(Continued)

FOREIGN PATENT DOCUMENTS
JP     08190543     7/1996
(Continued)

OTHER PUBLICATIONS

Peter Elias, "Interval and Recency Rank Source Coding Two On-Line Adaptive Variable Length Schemes" IEEE Transactions on Information Theory, vol. IT-33, No. 1, Jan. 1987, pp. 3-10.

(Continued)

*Primary Examiner* — Khanh B Pham
*Assistant Examiner* — Johnese Johnson
(74) *Attorney, Agent, or Firm* — IP Authority, LLC; Ramraj Soundararajan

(57) ABSTRACT

A variable-length binary string is utilized to encode node identifiers in a tree for an XML document object model. A general prefix encoding scheme is followed; a node identifier is generated by the concatenation of encodings at each level of a tree along a path from a root node to another particular node. Arbitrary insertions are supported without change to existing node identifier encodings. In addition, the method provides for document order when unsigned binary string comparison is used to compare encoded node identifiers. In support of sub-document concurrency control, prefix encoding provides a way to derive ancestor-descendant relationships among nodes in a tree. Lastly, the encoding method provides a natural pre-order clustering sequence, also known as depth-first clustering. If a prefix is applied to an encoding with a level number, starting with zero at the root, width-first clustering will result. A mixed clustering can also be supported.

12 Claims, 5 Drawing Sheets

U.S. PATENT DOCUMENTS

| | | | |
|---|---|---|---|
| 6,563,441 B1 | 5/2003 | Gold | 341/67 |
| 6,587,057 B2 | 7/2003 | Scheuermann | 341/67 |
| 6,610,104 B1 | 8/2003 | Lin et al. | |
| 6,647,391 B1 | 11/2003 | Smith et al. | |
| 6,810,414 B1 | 10/2004 | Brittain | |
| 6,889,226 B2 * | 5/2005 | O'Neil et al. | 707/100 |
| 7,072,904 B2 | 7/2006 | Najork et al. | |
| 7,080,065 B1 | 7/2006 | Kothuri et al. | |
| 7,246,138 B2 | 7/2007 | McCauley et al. | |
| 7,274,671 B2 * | 9/2007 | Hu | 370/256 |
| 7,293,005 B2 | 11/2007 | Fontoura et al. | |
| 7,293,028 B2 | 11/2007 | Cha et al. | |
| 2002/0099715 A1 | 7/2002 | Jahnke et al. | |
| 2002/0120679 A1 * | 8/2002 | Hayton et al. | 709/203 |
| 2002/0145545 A1 | 10/2002 | Brown | 341/50 |
| 2003/0014397 A1 | 1/2003 | Chau et al. | |
| 2003/0023528 A1 | 1/2003 | Wilce et al. | |
| 2003/0088639 A1 * | 5/2003 | Lentini et al. | 709/217 |
| 2004/0002939 A1 | 1/2004 | Arora et al. | |
| 2004/0044959 A1 | 3/2004 | Shanmugasundaram et al. | |
| 2004/0111672 A1 * | 6/2004 | Bowman et al. | 715/513 |
| 2004/0128296 A1 | 7/2004 | Krishnamurthy et al. | |
| 2004/0167864 A1 | 8/2004 | Wang et al. | |
| 2004/0167915 A1 | 8/2004 | Sundararajan et al. | |
| 2004/0205638 A1 | 10/2004 | Thomas et al. | |
| 2005/0055336 A1 | 3/2005 | Hui et al. | |
| 2005/0125431 A1 | 6/2005 | Emmick et al. | |
| 2005/0192955 A1 * | 9/2005 | Farrell | 707/5 |
| 2005/0210052 A1 | 9/2005 | Aldridge | |

FOREIGN PATENT DOCUMENTS

| | | |
|---|---|---|
| JP | 2001034619 | 2/2001 |
| JP | 2002269139 | 9/2002 |
| JP | 2004178084 | 6/2004 |
| WO | 0142881 | 6/2001 |
| WO | 0203245 | 1/2002 |

OTHER PUBLICATIONS

Nasser Tadayon et al., "Grouping Algorithm for Lossless Data Compression" IEEE Computer Society, Data Compression Conference Mar.-Apr. 1998.

Grust, "Accelerating XPath Location Steps," *ACM SIGMOD 2002*, Jun. 4-6, 2002, Madison, Wisconsin, pp. 109-120.

Bremer et al., "An Efficient XML Node Identification and Indexing Scheme," Technical Report CSE-2003-04, Dept. of Computer Science, University of California at Davis, 2003, 14pgs.

Bruno et al., "Holistic Twig Joins: Optimal XML Pattern Matching," *ACM SIGMOD 2002*, Jun. 4-6, 2002, Madison, Wisconsin, pp. 310-321.

Li et al., "Indexing and Querying XML Data for Regular Path Expressions" *Proceedings of the 27th International Conference on Very Large Data Bases*, Sep. 11-14, 2001, Rome, Italy, pp. 361-370.

Cohen et al., "Labeling Dynamic XML Trees," *Proceedings of the 21st ACM SIGMOD-SIGACT-SIGART Symposium on Principles of Database Systems*, Jun. 4-6, 2002, Madison, Wisconsin, pp. 271-281.

Jagadish et al., "On Effective Multi-Dimensional Indexing for Strings," *ACM SIGMOD 2000*, May 14-19, 2000, Dallas, Texas, pp. 403-414.

"Technique for Performing Generalized Prefix Matches," *IBM Technical Disclosure Bulletin*, V40, N3, Mar. 1997, pp. 189-200.

Wang et al., "ViST: A Dynamic Index Method for Querying XML Data by Tree Structures," *ACM SIGMOD 2003*, Jun. 9-12, 2003, San Diego, California, pp. 110-121.

Guo et al., "XRANK: Ranked Keyword Search over XML Documents," *ACM SIGMOD 2003*, Jun. 9-12, 2003, San Diego, California, pp. 16-27.

Garofalakis et al., "XTRACT: A System for Extracting Document Type Descriptors from XML Documents," *ACM SIGMOD 2000*, Dallas, Texas, V29, N2, pp. 165-176.

Kanne et al., "Efficient Storage of XML Data," Universitat Mannheim, Germany, Jun. 16, 1999, pp. 1-20.

Zhang, "XML Data Model Storage," IBM Confidential, Mar. 17, 2004, pp. 1-10.

Zhang, "XML Data Model Storage Advanced Features," IBM Confidential, Apr. 25, 2004, pp. 1-4.

Glance et al., "Generalized Process Structure Grammars (GPSG) for Flexible Representations of Work," Proceedings of the 1996 AMC Conf. on Computer Supported Cooperative Work, pp. 180-189.

Fiebig et al., "Anatomy of a Native XML Base Management System," VLDB Journal, V11, 2002, pp. 292-314.

Amer-Yahia et al., "Logical and Physical Support for Heterogeneous Data," Proceedings of the 11th Int'l Conf. on Information and Knowledge Management (CIKM2002), New York, NY, Nov. 4-9, 2002, pp. 270-281.

* cited by examiner

SELF-ADAPTIVE PREFIX ENCODING FOR STABLE NODE IDENTIFIERS

BACKGROUND OF INVENTION

1. Field of Invention

The present invention relates generally to the field of XML node identifiers. More specifically, the present invention is related to self-adaptive prefix encoding of stable node identifiers.

2. Discussion of Prior Art

In XML databases with an object storage model, such as XPath 2.0 and XQuery 1.0 data model or DOM (Document Object Model), node identifiers are fundamental to operations including maintaining document order, searching, updating, and concurrency control. Node identifiers are assigned when an XML document is converted into an object model and stored into a database, or when new nodes are inserted in a logical XML tree. Existing solutions for encoding node identifiers can be classified as physical or logical solutions.

In a storage system that organizes storage space using pages and records, a physical node identifier is typically either a record identifier (RID) or an extension of an RID, depending on whether a node is a record or a structure within a record. An RID is a page number followed by the index of a record within that page. The entry with that particular index within an array indicates the offset of a record within a page. If a node is a structure within a record, then a node identifier usually consists of an RID and another index to locate the node within the record. An RID can be used to locate a record; to locate a node inside a record, it is necessary to have an RID with either an offset within a record or a slot index if the record has a layout similar to a structured document page. If such objects are stored in memory, physical IDs are usually memory addresses.

RIDs are treated as physical storage addresses for records. One advantage of using RIDs as a node identifier is the ability to quickly position a node in physical storage. However, RIDs cannot provide for document order of nodes. Because there is no parent-child relationship information within a physical node id, it alone is unsuitable for direct use in sub-document concurrency control, which typically requires the use of ancestor-descendant relationship information. A separate structure keeping track of parent-child relationships is necessary to provide for concurrency control. Another disadvantage is that physical node ids are used as reference pointers in parent-child relationships, making re-organization across pages of XML objects difficult. This is because moving a node across a page requires a new RID, and all references to the moved node would need to be updated to accommodate the new RID. Otherwise, a forward record, which is a record that contains an address rather than an actual record, would be needed. Because a forward record contains an address of an actual record that is physically removed from the current record, it is more costly to access in terms of input and output (I/O) operations.

An interval encoded node identifier, which is an example of a logical node identifier, uses a pair of integers specifying starting and ending positions and optionally, a level number (startpos:endpos, levelno). The start and end position of a node are either the logical offset of the start and end of a node's position in the text of an XML document or sequence numbers corresponding to node entry and exit in a pre-order traversal of the XML object tree. For two nodes, n1 and n2, with node ids (s1:e1, l1) and (s2:e2, l2), respectively, if the start position of the first node is less than the start position of the second node and the end position of the first node is greater than the end position of the second node, then the first node is an ancestor of the second node. In addition, if the level number of the first node is increased by one to result in the second level number, then the first node is a parent of the second node.

This type of logical encoding of node ids is commonly used in relational representations of an XML object model without requiring a relationship between an interval encoding representation and a physical storage address. In addition, such an encoding method is better suited for read-only documents. In order to deal with insertion and update operations, some sequence number spaces are typically left between consecutive nodes identifiers for insertions. This method produces a need to modify existing node identifiers when reserved sequence numbers are completely exhausted thus making it an expensive operation.

Another method of logically encoding node identifiers includes prefix encoding node identifiers. This method uses a concatenation of numbers (local identifiers) for nodes along the path from the root node to a particular node to generate a node identifier. Local identifiers are assigned to children of a parent are based on their sequence, with optionally reserved spaces in between local identifiers for future insertions. Prefix-encoded identifiers are used for document ordering, ancestor-descendant and parent-child relationships, and also for sub-document concurrency control. The method of encoding produces node identifiers that can be clustered. If a standard clustering index on a set of node identifiers is created, natural clustering will be in document order, or the order corresponding to a depth-first traversal. If a level number indicating the logical level on which a node is situated is prefixed to the front of a set of node identifiers and an index is created on it, clustering order will correspond to a breadth-first traversal. However, existing encoding methods create maintenance concerns when insertion or update operations are performed.

Existing encoding schemes are not well equipped to handle identifier maintenance issues in face of arbitrary insertions. Current research efforts are directed toward using statistics for optimal encoding and number space allocation for node insertion. However, statistics are not available for new documents during the initial phase of database population. In addition, the use of statistics to generate node identifiers cannot guarantee that an existing encoding method will be sufficient in the face of arbitrary insertions; it can only increase the probability that assigned node identifiers will not need to be changed.

U.S. Pat. No. 6,563,441 B1 discloses a program for decoding variable length codes and generating a binary tree that represents the coding scheme, a lookup table from the binary tree that can be used to decode variable-length codes having length less than or equal to a threshold length. The method comprises obtaining data that defines connections between a root node and a plurality of other nodes such that each of the other nodes is a child node that connects to one respective parent node, each parent node connects to at most two child nodes, and the connections between a parent node and its respective child nodes are associated with either of two binary values. A node that does not connect to any child node is a leaf node and the system obtains data that defines a respective value for each leaf node; generating a binary tree data structure representing the root node and the other nodes with branches having binary values and connecting the nodes according to the data that defines connections. No valid code is the prefix of any other valid code; and therefore the codes are such that a stream of encoded information can be parsed unambiguously into codes without requiring any special symbols or controls to mark the boundary between codes.

U.S. Pat. No. 6,587,057 B2 discloses high performance memory efficient variable-length coding decoder; with code words grouped by prefix and recorded to reduce the number of bits that must be matched, thus reducing the memory requirements.

U.S. Pat. No. 6,539,369 B2 discloses a method for storing sparse and dense sub-trees in a longest prefix match lookup table. The sparse sub-tree descriptor stores at least one node descriptor. The node descriptor describes a set of leaves in the sparse sub-tree having a common value; and the common value is encoded in the node descriptor using run length encoding.

U.S. Pat. No. 6,313,766 discloses a method for accelerating software decode of variable length encoded information; with logic device which outputs a fixed length value corresponding to a variable length code received as part of the bits stream of the variable length encoded information.

U.S. Pat. No. 5,883,589 discloses a variable length code construction apparatus; with a prefix processing unit for producing a codeword including at least "1"bit, the prefix of the codeword having continuous "0"bits.

U.S. 2002/0145545 A1 discloses entropy coding using adaptable prefix codes.

Whatever the precise merits, features, and advantages of the above cited references, none of them achieves or fulfills the purposes of the present invention.

Therefore, there is a need in the art for a self-adaptive and efficient prefix-encoding method for stable node identifiers. The method of the present invention is self-adaptive in that shorter encodings are used for a smaller number of nodes and longer encodings are used for a larger number of nodes. It is not required to have knowledge of the number of nodes before node identifiers are assigned. The encoding method of the present invention allows for arbitrary insertion existing node identifiers do not have to be modified when a node is inserted to keep node identifiers in document order. It also follows a basic prefix encoding method, thus having all the properties of a prefix encoding. However, the method of the present invention is unique in that encodings of existing nodes are stable, meaning that they do not need to be changed, regardless of the number and placement of inserted nodes. This property holds true because a node identifier is not modeled as a fixed string of decimal numbers, but rather as a variable-length binary string.

SUMMARY OF THE INVENTION

The method of the present invention utilizes a variable-length binary string to encode node identifiers in a logical tree of nodes for an XML document object model. A general prefix encoding method is followed; a node identifier is generated by the concatenation of encodings at each level, called local identifiers, of a logical tree along a path from a root node to another particular node. In other words, a node identifier is always a parent node identifier, to which a local identifier of the last node in the path is appended. Children of a parent node are assigned a local identifier according to their sequence under that particular parent node, and children of different nodes are assigned local identifiers independently at each level in a logical tree. An optional level number may be assigned to nodes based on the logical level in a tree structure on which a node is situation. A root node of a logical tree is assigned a local identifier of zero, and can be ignored in the prefix encoding of all descendants. The last byte of a multi-byte local identifier, also known as a boundary byte, in an encoding of a node identifier has zero as its least significant bit and one as the least significant bit of all other bytes. Therefore, viewed as an integer, a local identifier or a node identifier is always an even number.

Insertion between sequentially encoded node identifiers is possible without change to existing node identifiers. To assign a local identifier to a newly inserted node, if there is no encoding between encoded node identifiers of a previous sibling and a next sibling having the same number of bytes as both siblings and being an even number, one is added to the encoding of a previous sibling, and a new byte extension ending with an even number is added.

The encoding method of the present invention is self-adaptive; for a wide tree, longer encodings will be used at each level. Unlike fixed-length encoding at each level, a shorter encoding is used at the beginning stages of assigning identifiers, and is extended as new nodes are added or inserted. Arbitrary insertions are supported without change to any existing node identifiers. However, skewed insertions lead to longer encodings. The use of statistics in the distribution of placement of newly inserted nodes decreases the possibility of skewed encodings.

In addition, the method of the present invention provides for document order when unsigned binary string comparison is used to compare encoded node identifiers. Any given node identifier is a concatenation of local identifiers of nodes at all levels from a root node along the path to a current node. Thus, it is possible to determine a parent node identifier by removing from the end of a current node identifier, one level of local identifier, by checking for a boundary byte having a least significant bit of zero.

The present invention provides for an increase in the efficiency of encoding and decoding processes. In this case, assigning an identifier to a node is an encoding process, and a decoding process determines node identifiers of a node's ancestors or siblings. The efficiency of this approach is reflected in the simplicity of the method and the lack of update to existing node identifiers. Because a node identifier is a logical identifier, a mapping from a node identifier to a physical address is needed, as with any other logical identifier encoding scheme. Two approaches can be used for the mapping of logical identifiers to RIDs (i.e., physical record IDs). A first approach is through the use of B+-tree indices utilizing a node identifier as an index key. A second approach is to use a hash table.

The present invention also provides for the support of sub-document concurrency control; for example, updating a sub-tree under a node, requires that an exclusive lock and an intent exclusive lock be used. An exclusive lock is placed on a node and its sub-tree and an intent exclusive lock is placed on a path from a current node to a root node. In support of concurrency control, it is necessary to have knowledge of ancestor-descendant relationships among nodes in a logical tree. Prefix encoding provides a way to easily derive relationships among nodes. For example, to determine if two nodes have an ancestor-descendant relationship, node identifiers of both nodes are compared to determine if one identifier is a prefix of the other.

Lastly, the encoding method of the present invention provides for a natural pre-order clustering sequence, also known as depth-first clustering. If a prefix is applied to node identifiers indicating a level number, beginning with zero at a root node, breadth-first clustering will result. A mixed clustering is also supported. To produce a mixed clustering sequence, for example, breadth-first clustering order for nodes closer in proximity to a root node and depth-first clustering order for nodes closer in proximity to the leaf-level; a level number and node identifier pair is used as a cluster index key for nodes closer in proximity to a root node, thus leading to breadth-first clustering and a fixed level number is used for nodes closer in proximity to the leaf-level, thus leading to depth-first clustering.

DESCRIPTION OF THE PREFERRED EMBODIMENTS

Figure 1:
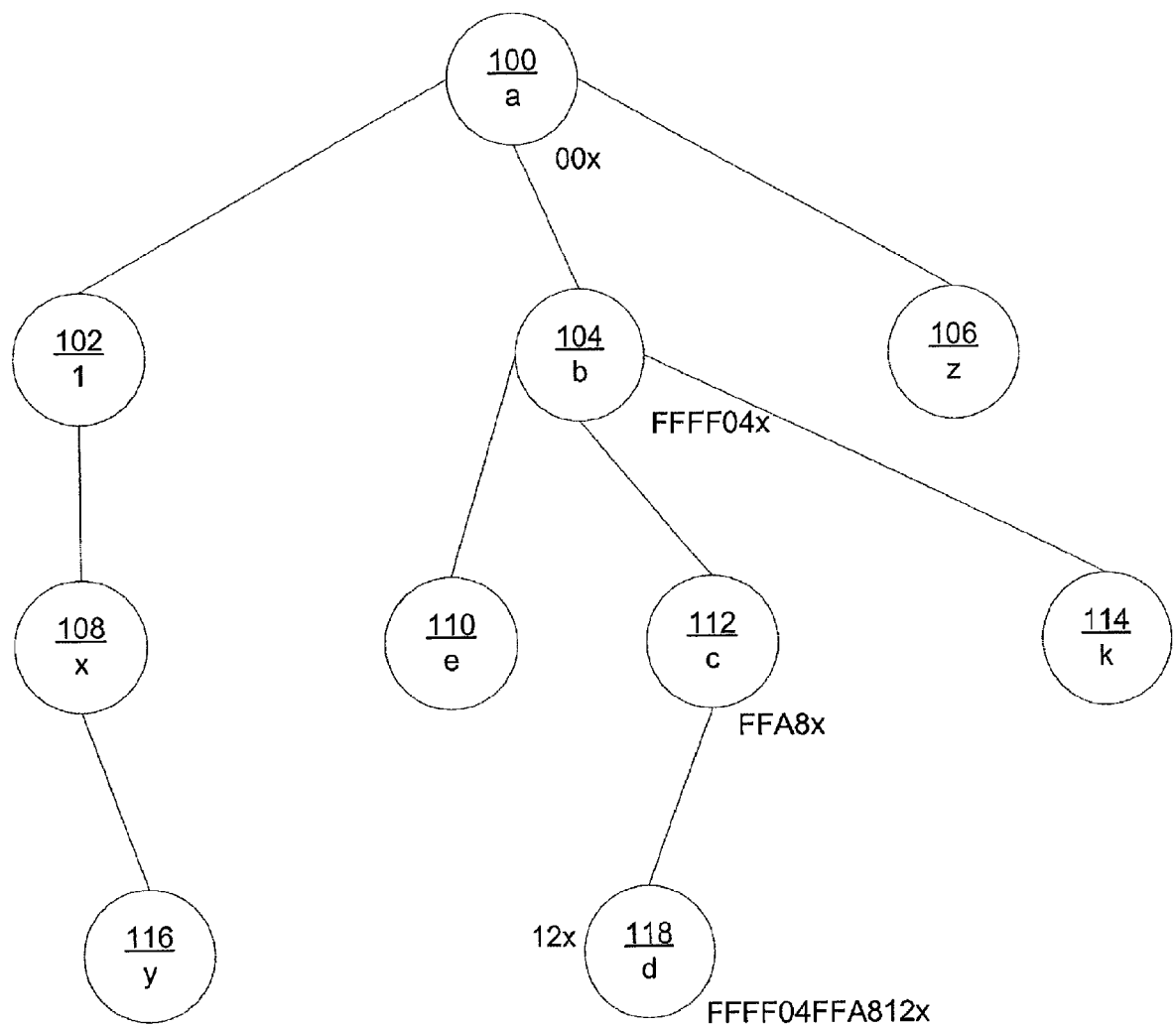
FIG. 1 illustrates a logical XML tree.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The method of the present invention utilizes variable-length binary strings to encode node identifiers in a logical tree of nodes for an XML document object model. A general prefix encoding scheme is followed; during initial insertion of a node into an XML document tree, nodes under a parent are assigned local identifiers sequentially. To generate a node identifier, local identifiers for all nodes along a path from a root node to a current node are sequentially concatenated, including the local identifier for a current node. Because a node identifier encoding for a root node is always zero, it is ignored in the concatenation. In the following description, a byte is used as a unit by way of illustration and not limitation to describe the encoding method of the present invention. Other units, such as a four-bit nibble, are applicable.

Referring now to FIG. 1, a logical XML tree is shown. To determine a node identifier encoding for node d 118, a logical path from root node a 100, to node d 118 is constructed. The logical path is constructed of segments from node a 100 to node b, node b 104 to node c 112, and node c 112 to node d 118. Local identifiers for each node along a logical path from a root node to a current node are sequentially concatenated to form a node identifier for a current node. In FIG. 1, the node identifier encoding for node a 100, a root node, is ignored, and local identifiers for node b 104, node c 112, and node d 118 are concatenated to generate a node identifier for node d 118. In this case, a local identifier for node d 118 is 12x and the node identifier is FFFF04FFA812x and its length is six bytes. In total, there are seven bytes if a length byte is included. If a length byte is included in a node identifier, it is positioned as a most significant byte, however it is implied rather than explicitly presented as a part of a node identifier. Using a length byte places limitations on the length of encodings. From the node identifier for node d 118 it is known that node d 118 is at the fourth level in the logical XML tree. From the node identifier for node d 118, identifiers for ancestors of node d 118 are determined by separating into parts the node identifier for node d 118 at each boundary byte. Each boundary byte is determined by checking if the least significant bit has a zero value.

TABLE 1

| | EXAMPLES OF EXTENSION MECHANISMS | | | |
|---|---|---|---|---|
| BYTES | 1, 2, 3 | 1, 2–3, 4–6 | 1, 2–4, 5–8 | 2, 3–4 |
| 1 | 127 | 127 | 127 | |
| 2 | 254 | | | 16,256 |
| 3 | 381 | 16,383 | | |
| 4 | 508 | | 2,064,766 | 32,502 |
| 5 | 635 | | | |
| 6 | 762 | 2,081,022 | | |
| 7 | 889 | | | |
| 8 | 1016 | | 264,274,046 | |

Referring now to Table 1, several local identifier extension mechanisms are shown. First, all possible node identifiers utilizing a base length are assigned. When all possible local identifiers utilizing a base length are exhausted, local identifiers utilizing a first extension length are assigned. A first extension length is at least one byte and may be multiple bytes. A byte or bytes determined by a first extension length are appended to a base length to encode further local identifiers. A second extension length may be used if a first extension is not enough to encode all the nodes. The manner in which different extension lengths are utilized after local identifiers of a base length or a previous extension length have been exhausted is known as an extension mechanism. When all possible local identifier utilizing a base length and a first extension length are exhausted, local identifiers utilizing a second extension length are assigned. A second extension length is at least one byte and can be equal to, greater than, or less than a first extension length. This process continues until all nodes in a logical tree are assigned a local identifier and ultimately, node identifier encodings. An extension mechanism is employed each time local identifiers utilizing a certain length string are exhausted, or each time a specified value is reached prior to exhausting local identifiers.

If a single byte were used for encoding local identifiers local identifiers would comprise 02x, 04x, and FEx in hexadecimal notation. As shown in Table 1, after all one-byte local identifier combinations are exhausted; any extension length may be chosen to continue encoding local identifiers. Two bytes are not necessarily a suitable extension length by which to encode local identifiers after all base length encoding combinations are exhausted; this is because the number of bytes necessary to encode a node identifier increases at a rapid rate for a large number of nodes under a single parent. There are 127 possible node identifier encodings for a one-byte length string, 254 for a two-byte length string, and 381 possible node identifier encoding combinations for a three-byte length string. By this logic, over seven thousand bytes would be required to encode local identifiers for a million nodes under a single parent.

The following sequence of encodings will be produced if a one byte length string is used to encode local identifiers and is extended one byte at a time as possible local identifier combinations are exhausted: 02x, 04x, 06x, 08x, 0Ax, 0Cx, 0Ex, 10x, 12x, . . . FEx, FF02x, FF04x, . . . , FFFEx, FFFF02x, FFFF04x, . . . , FFFFFEx. In an encoding method where a two-byte extension length is used to encode node identifiers until all possible combinations are exhausted, sequential encodings after FEx would be as follows:

FF0102x, FF0104x, . . . , FF01FEx,
FF02x

FF0302x, FF0304x, . . . , FF03FEx,
FF04x,
. . .
FFFEx,
FFFF02x, FFFF04x, . . . , FFFFFEx.

An example of an alternative extension is to start using two bytes when the first byte becomes larger than 80x. The sequence of local identifiers would be as follows: 02x, 04x, . . . , 7Ex, 80x, 8102x, . . . , 81FEx, 82x, 8302x, . . . , FFFEx.

From Table 1, it can be seen that there are encoding efficiency tradeoffs in regards to the selection of a base length with which to start local identifier encoding and as to the selection of an extension length by which to increase the length of encodings.

Figure 2:
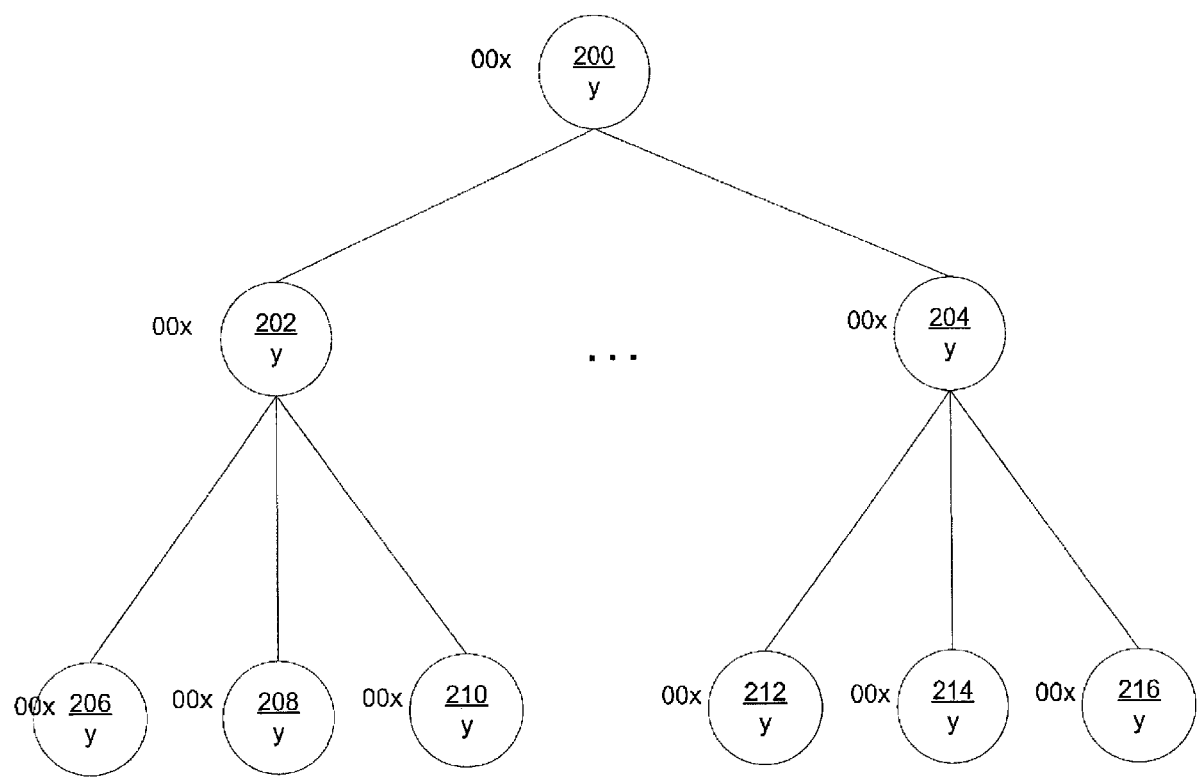
FIG. 2 illustrates a balanced XML tree.

FIG. 2 shows an example of a balanced tree. For small, balanced logical trees, a one-byte local identifier at each level is sufficient. For relatively larger, balanced trees, a two-byte local identifier is more appropriate. If there are statistics to guide the selection of encoding lengths, a more appropriate base length and more appropriate extension lengths can be chosen. For example, if it is known that most nodes in a logical tree will not have more than 127 children, one byte is chosen to first encode local identifiers. Otherwise, two bytes can be chosen. As a default method, one byte is used as a base length for encoding and one unit more than previous extension length is used as an extension each time local identifier combinations are exhausted. Since local identifiers at each level are independent of each other as long as the identified nodes descend from different parents, only a parent with a large number of children, also known as a wide tree, will require longer strings for local identifier, and thus, node identifier encodings. For a balanced tree with 127 or fewer children under a node, a twenty-level tree requires only twenty-byte node identifiers for tree leaves, including a one-byte length field for a variable-length string. A length field may be greater than a single byte to accommodate deep trees.

Figure 3:
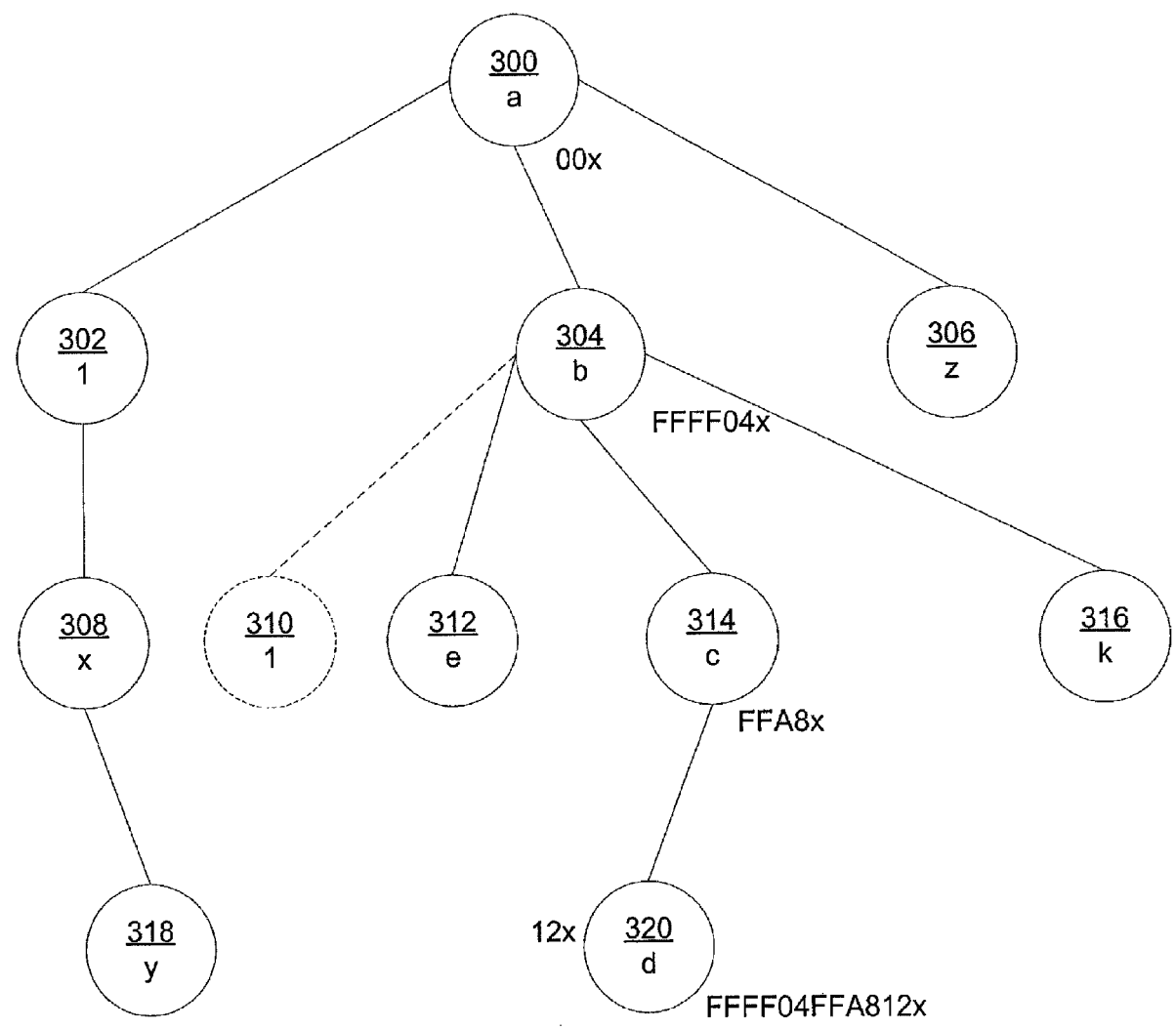
FIG. 3 illustrates the insertion of a node as a first child under a parent in an XML tree.

Shown in FIG. 3 is an example of inserting a new node as a first child under a single parent node. In order to insert nodes between sequentially encoded nodes, several cases are considered. In a first embodiment, if node 310 is inserted as a first child in front of any other children of a parent node, then the last byte of existing first child 312 is checked. If the last byte is not the smallest even value, then an even number greater than zero and less than the last byte is selected to encode a local identifier of a newly inserted node. If the last byte of an existing first child is 02x, the local identifier for a newly inserted node is generated by replacing 02x with 01x in the local identifier for existing first child 312, extended by a byte having a value of 02x, or another even number. For example, the extended byte can have a value of 80x to leave possible local identifier combinations for additional node insertions. A node identifier encoding combination can be extended by any number of bytes as selected by an extension mechanism. If existing first child 312 has a local identifier with a value of 08x, then newly inserted first child 310 can have a local identifier with a value of 04x. If existing first child 312 has a local identifier with a value of 02x, a local identifier encoding for newly inserted node 310 can have a value of 0102x or 0180x. As another example, existing first child 312 has a local identifier with a value of 0102x; a local identifier for newly inserted node 310 can have a value of 010102x or 010180x.

Figure 4:
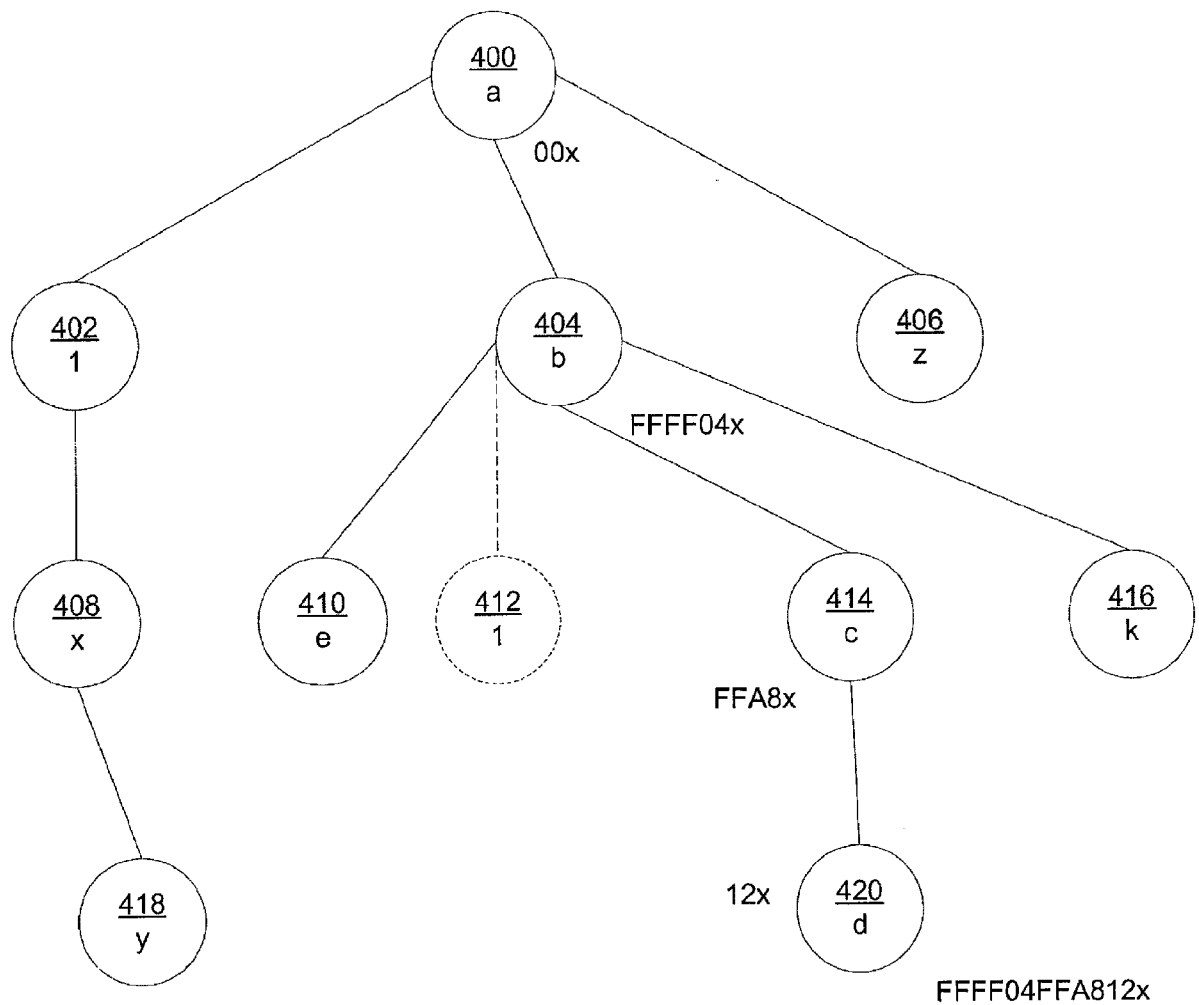
FIG. 4 illustrates the insertion of a node between siblings under a parent in an XML tree.
Figure 5:
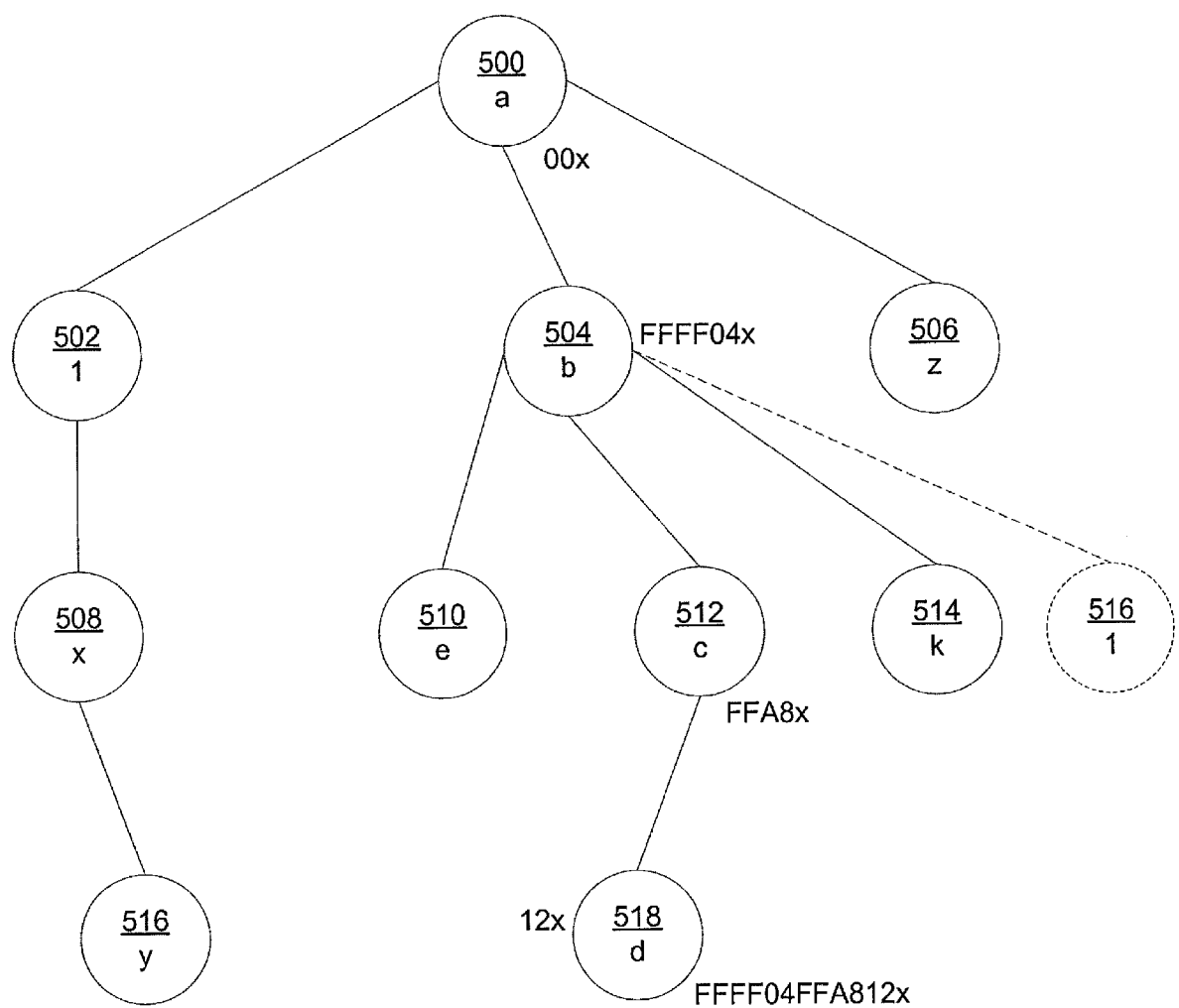
FIG. 5 illustrates the insertion of a node as a last child under a parent in an XML tree.

Shown in FIG. 4 is an example of inserting a node between two siblings. In a second embodiment, if node 412 is inserted between two siblings 410 and 414, a node identifier encoding is needed to fall logically between the encodings of a previous sibling and a next sibling under a single parent. Assuming a local identifier for previous sibling 410 is i and a local identifier for next sibling 414 is j, the following three cases occur.

In the first case, if the length of the local identifier of node i 410 is equal to the length of the local identifier of node j 414, then if i+2<j, there is space between the local identifier of i and the local identifier of j to add another local identifier 412. A local identifier for newly inserted node 412 takes on a value of i+2 or an even number equal or close to (i+)/2 to take the midpoint between the values of the local identifier of node i 410 and the local identifier of node j 414. Otherwise, if the length of the local identifier of node i 410 is equal to the length of local identifier of node j 414 and i+2=j, then the current length of encodings is extended with at least one byte, depending on a chosen extension mechanism. The length of a new local identifier is the length of the local identifier of node j in addition to a maximum of a chosen extension length, and the value of a local identifier for a newly inserted node for the first i bytes is i+1, and in the case of a single unit extension length, the new byte can be 02x, 80x, or any even number having one unit of length.

For example, if a local identifier for node i 410 is 12x and a local identifier for node j 414 is 16x, then 14x may be used as a local identifier for newly inserted node 412. If a local identifier for node i 410 is 12x and a local identifier for node j 414 is 14x, then a local identifier for a newly inserted node 412 can be 1302x or 1380x.

In the second case, where the string length of a local identifier of node i 410 is less than the string length of a local identifier of node j 414, then it is determined if a local identifier for node i 410 is the last available identifier with the same length that is smaller in value than a local identifier for node j 414. If such is not the case, the next available number having the same string length as the local identifier for node i 410 can be used to encode a node identifier for a newly inserted node 412. If a local identifier for node i 410 is the last encoding with the same length that is smaller than a local identifier for node j 414, then if a local identifier for node j 414 is not the first available encoding having the same length that is greater in value than a local identifier for node i 410, a local identifier encoding smaller in value than a local identifier for node j 414 having a string length equal to the string length of a node identifier of node j 414 is generated and assigned. Otherwise, the last byte of the local identifier of node j 414 is changed to 01x to generate a local identifier for a newly inserted node 412 and extended by at least one byte having an even number. A one-byte extension may take on a minimum value of 02x or another arbitrary even number, for example 80x, to leave spaces between local identifiers for future node insertions.

For example, if a local identifier for node i 410 is 12x and local identifier for node j 414 is 1580x, 14x can be used to assign a local identifier to a node inserted 412 between node i 410 and node j 414. If a local identifier of node i 410 is 12x and a local identifier of node j 414 is 1380x, then 1340x can be used to encode a local identifier for a newly inserted node 412. If a local identifier for node i 410 is 12x and a local identifier for node j 414 is 1302x, then 130180x can be used to assign a local identifier to a newly inserted node 412. If a local identifier for node i 410 is 12x and local identifier for node j 414 is 130102x, then 13010180x can be used to assign a local identifier to a newly inserted node 412.

In the third case, if the string length of a local identifier for node i 410 is greater than the string length of a local identifier for node j 414, then if a local identifier for node j 414 is not the smallest encoding value with the same length that is greater than i in value, then a local identifier with a smaller value than a local identifier for node j 414 with the same length is assigned. Otherwise, if a local identifier for node i 410 is not the largest encoding value with the same length that is smaller than a local identifier for node i, one of the larger values are used to encode a local identifier for the newly inserted node 412. Otherwise, a new identifier is created by taking a local identifier for node i 414 and extending it by an extension length; by setting the last byte to FFx and the newly extended bytes to an even number, taking on a value between 02x to FEx in the case of a one byte extension.

For example, if a local identifier for node i 410 is 1180x and a local identifier for node j 414 is 14x, then 12x can be used to encode a local identifier for a newly inserted node 412. If a local identifier for node i 410 is 1380x and local identifier for node j 414 is 14x, 13A0x can be used to encode a newly inserted node 412. If a local identifier for node i 410 is 13FEx and a local identifier for node j 414 is 14x, there is no even number in between the identifiers of node i 410 and node j 414. Thus, 13FF02x or 13FF80 is used to encode a newly inserted node 412. If a local identifier for node i 410 is 13FFFEx and local identifier for node j 414 is 14x, 13FFFF80x can be used to encode a newly inserted node 412 locally.

In a third embodiment, if a node is inserted as a last child 516 after all other children 510, 512, 514 of a single parent 504, the method of the present invention is followed to generate local identifier encodings sequentially to obtain a next encoding.

Additionally, the present invention provides for an article of manufacture comprising computer readable program code contained within implementing one or more modules to prefix encode one or more node identifiers in an XML tree. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) sequentially prefix encoding nodes inserted in a logical XML tree; (b) extending string length of prefix encodings by an extension mechanism; and (c) assigning local identifiers to nodes inserted in a logical XML tree.

CONCLUSION

A system and method has been shown in the above embodiments for the effective implementation of a self-adaptive prefix encoding for stable node identifiers. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program.

The above enhancements are implemented in various computing environments. For example, the present invention may be implemented on a conventional IBM PC or equivalent. All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of object-oriented programming.

The invention claimed is:
1. A computer-based method comprising the steps of:
   a. converting a mark-up language document to a logical tree-based representation comprising a plurality of nodes, each node other than a root node having a local identifier,
   b. choosing an initial base length of at least one byte with which to encode local identifiers of said nodes,
   c. sequentially encoding each local identifier other than said root node in hexadecimal notation starting with an initial hexadecimal value and incrementing the initial hexadecimal value by said initial base length,
   d. adaptively extending said initial base length by at least one additional byte upon exhausting all incremental hexadecimal values based on said initial base length,
   e. encoding at least one local identifier other than said root node and a node not encoded in step (c) based on said extended base length,
   f. assigning node identifiers to said plurality of nodes other than said root node by concatenating encoded values of local identifiers of all nodes along a path from said root node to a node to which a node identifier is currently being assigned, and
   g. outputting and storing said node identifiers associated with said nodes of said mark-up language document in computer storage.

2. The computer-based method of claim 1, wherein inserting a node into an existing tree does not require change to existing node identifiers.

3. The computer-based method of claim 1, wherein a node is inserted between a first node and a second node having consecutive local identifiers.

4. The computer-based method of claim 3, wherein said inserted node is assigned a local identifier having a string length longer than string length of said first node.

5. An article of manufacture, said article of manufacture comprising a computer readable storage medium having computer readable program code embodied therein, said computer readable program code comprising modules being executed by a computer comprising modules implementing code to:
   a. converting a mark-up language document to a logical tree-based representation comprising a plurality of nodes, each node other than a root node having a local identifier,
   b. choose an initial base length of at least one byte with which to encode local identifiers of said nodes,
   c. sequentially encoding each local identifier other than said root node in hexadecimal notation starting with an initial hexadecimal value and incrementing the initial hexadecimal value by said initial base length,
   d. adaptively extending said initial base length by at least one additional byte upon exhausting all incremental hexadecimal values based on said initial base length,
   e. encoding at least one local identifier other than said root node and a node not encoded in step (c) based on said extended base length,
   f. assigning node identifiers to said plurality of nodes other than said root node by concatenating encoded values of local identifiers of all nodes along a path from said root node to a node to which a node identifier is currently being assigned, and g. outputting and storing said node identifiers associated with said nodes of said mark-up language document in computer storage.

6. The computer-based method of claim 1, wherein said assigned local identifiers are assigned values based on variable-length binary string encoding.

7. The article of manufacture of claim 5, wherein said assigned local identifiers are assigned values based on variable-length binary string encoding.

8. A computer-based method comprising the steps of:
a. choosing an initial base length of at least one byte with which to encode local identifiers of nodes of a logical tree-based representation of an XML document,
b. assigning a value of zero as a node identifier to a root node in a logical tree,
c. sequentially encoding each local identifier other than said root node in hexadecimal notation starting with an initial hexadecimal value and incrementing the initial hexadecimal value by said initial base length,
d. adaptively extending said initial base length by at least one additional byte upon exhausting all incremental hexadecimal values based on said initial base length
e. encoding at least one local identifier other than said root node and a node not encoded in step (c) based on said extended base length,
f. assigning node identifiers to said plurality of nodes other than said root node by concatenating encoded values of local identifiers of all nodes along a path from said root node to a node to which a node identifier is currently being assigned, and
g. outputting and storing said node identifiers associated with said nodes of said XML document in computer storage.

9. The method of claim 1, wherein said markup-language document is an XML document.

10. The method of claim 1, wherein encoding lengths are selected based on statistics defining a maximum number of descendants associated with any given node.

11. The article of manufacture of claim 5, wherein said mark-up language document is an XML document.

12. The article of manufacture of claim 5, wherein encoding lengths are selected based on statistics defining a maximum number of descendants associated with any given node.

* * * * *